United States Patent
Lanus

[15] 3,641,984
[45] Feb. 15, 1972

[54] ADJUSTABLE DOG COLLAR
[72] Inventor: Alfred L. G. Lanus, New York, N.Y.
[73] Assignee: L. Diaz Carlo, a part interest
[22] Filed: Jan. 22, 1970
[21] Appl. No.: 4,890

[52] U.S. Cl. ............................................................ 119/106
[51] Int. Cl. ........................................................ A01k 27/00
[58] Field of Search ............ 119/106, 109, 118; 54/34; 2/325, 322; 24/16, 17, 21, 166

[56] References Cited
UNITED STATES PATENTS 2,898,602  8/1959  Moss ........................................ 2/325 X
2,065,946  12/1936  Mader ................................ 119/106 UX
115,647  6/1871  Scott ........................................ 119/106
146,770  1/1874  Mersereau ............................... 119/106
1,408,123  2/1922  Mitchell ................................... 119/106

*Primary Examiner*—Hugh R. Chamblee
*Attorney*—Hopgood and Calimafde

[57] ABSTRACT

An adjustable dog collar includes an elongated strip having a single aperture at one end, and a bolt adjustably positioned at a predetermined location at its other end. That bolt passes through the aperture to establish a desired loop diameter and to provide an opening through which a leash may be attached.

3 Claims, 4 Drawing Figures

PATENTED FEB 15 1972

3,641,984

INVENTOR.
ALFRED L.G. LANUS

BY
Sandoe, Hopgood & Calimafde
ATTORNEYS

ADJUSTABLE DOG COLLAR

The present invention relates generally to animal collars, and particularly to an adjustable dog collar having simplified provision for the attachment of a leash.

The owning of a dog or a cat is one of the most popular activities of millions of families in all social and economic levels. The care and feeding of pets has thus become an industry of considerable size including several distinct areas, such as food, equipment, and the like. One of the basic items that a dog owner must possess is a collar which is usually placed about the neck of the animal. One prime factor in the selection of a dog collar is its cost, since a dog collar is an article of mass consumption often purchased by children and others having relatively small amounts of money available for this purpose.

To reduce the cost of manufacturing these collars, they are preferably made of several standard sizes and then adjusted by the dog's owner to conform the collar to the neck diameter of the dog on which the collar is to be used. This permits the collar to be used on dogs of different ages and sizes, and thus can be used on the same dog as he matures and grows without requiring the owner to buy several new collars over the lifetime of the animal.

To permit the dog to be controlled while he is being walked, as required by law in many localities, a tether or leash is commonly attached to the collar and is held at its free end by the dog's owner who in this manner maintains an appropriate degree of control over the dog's movements.

Another significant factor in the selection of a dog collar is its ease of use with respect to both its placement over the dog's neck, and the attachment of the leash thereto. As the individual performing these tasks is often a young child, it is highly desirable that the collar be secured with the exercise of a minimum amount of mechanical skill, while still providing secure and reliable retention on the animal.

While many collars have been designed and offered for sale, they are all deficient in satisfying one or both of the above-mentioned criteria of cost and simplicity in an optimum manner.

It is an object of the present invention to provide an adjustable dog collar which is simplified in construction and thus less expensive to manufacture, and less costly to the consumer.

It is another object of the present invention to provide an adjustable dog collar in which the element providing the adjustability of the collar diameter serves the additional function of providing the means for attaching the leash to the collar.

To these ends the dog collar of the invention is in the form of a elongated resilient member or strip having an opening at one end and a fastening element adjustably located at the other end for passage through the first mentioned opening. The ends of the strip overlie one another to form a circular collar of a predetermined diameter which is determined by the position of that element along the strip. That element is provided with an apertured part which extends beyond the other end of the strip when the ends overlie one another. A leash is passed through the aperture in the fastening element so that, as desired, the single fastening element serves the dual function of defining the adjustable diameter of the dog collar as well as providing the attachment end for the leash.

To the accomplishment of the above and to such other objects as may hereinafter appear, the present invention relates to an adjustable dog collar as defined in the appended claims, and as described in the following specification taken together with the accompanying drawing, in which:

Figure 1:
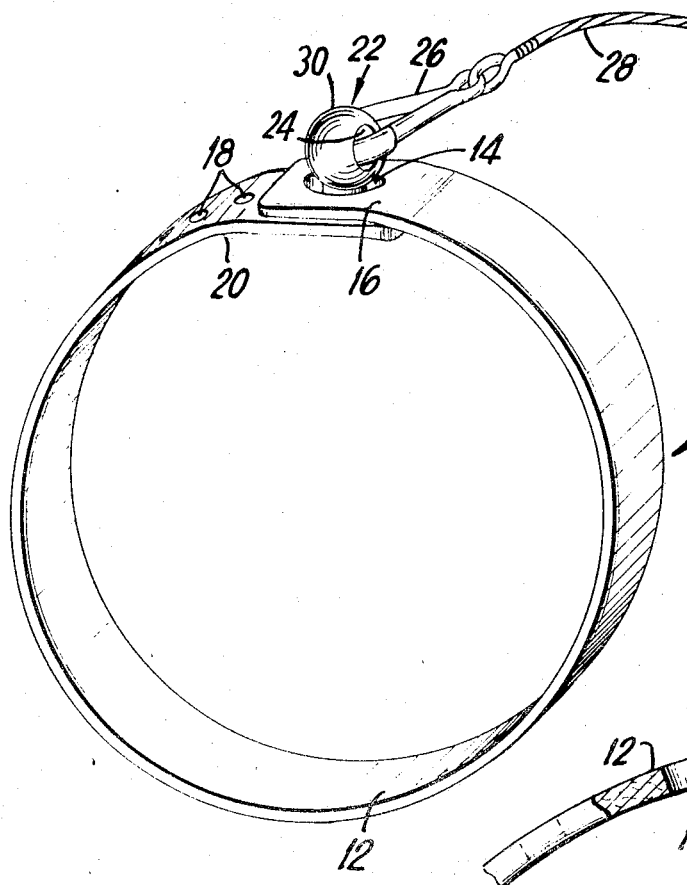
FIG. 1 is a perspective view of the dog collar of the invention shown in its closed or loop-defining configuration with one end of a leash attached thereto.

Referring to the figures the dog collar of the present invention generally designated 10 comprises an elongated resilient strip 12 made of a suitable resilient material such as leather or plastic. A longitudinal slot 14 is formed at one end 16 of the strip 12 while a plurality of axially spaced openings 18 are formed at the other end 20 of the strip.

Figure 3:
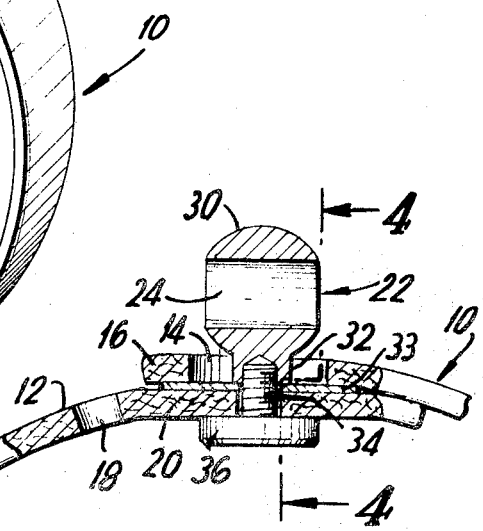
FIG. 3 is a cross-sectional view taken along the line 3—3 of FIG. 2.

Fastening means, here shown in a form of a loop-shaped bolt 22 is secured, as shown in FIG. 3, to end 20 at one of several predetermined locations thereat corresponding to the position of openings 18, as will be described more completely below. To form the circular collar shown in FIG. 1, opening 14 is passed over bolt 22 to bring end 16 into an overlying relationship with end 20. The upper extending portion of bolt 22 has a circular aperture 24 formed therethrough (FIG. 3), through which a hook 26 is snapped for retention to the outer periphery of the bolt. A leash or tether 28 is secured at one of its ends to hook 26, and its other free end is held by the dog's owner or tied to a securing post or the like, to limit the animal's freedom of motion.

It can thus be appreciated that the fastening element, to wit bolt 22, serves the dual function of adjustably defining the diameter of the collar, while at the same time providing the attachment device for the leash.

As herein specifically described bolt 22 comprises a upper spherical portion 30 in which the aperture 24 is formed, and to which the hook 26 is fastened. Portion 30 has a diameter less than the width of opening 14 to permit the spherical upper portion of bolt 22 to pass through opening 14 when the strip is formed into the circular collar shown in FIG. 1.

Figure 4:
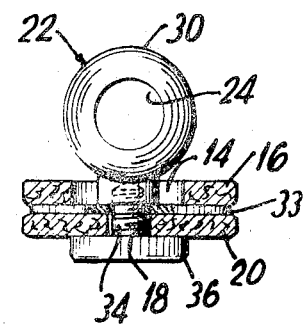
FIG. 4 is a cross-sectional view taken approximately along the line 4—4 of FIG. 3.
Figure 2:
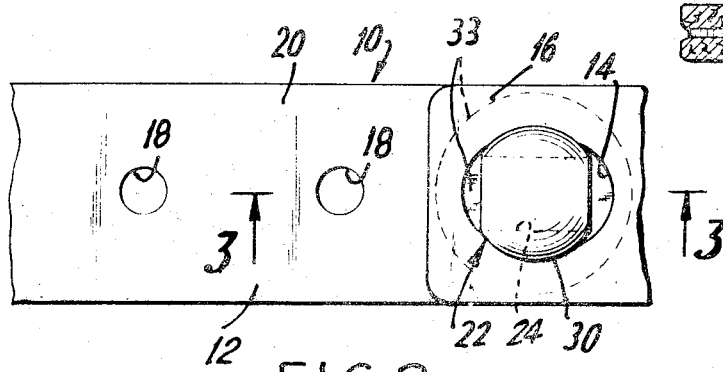
FIG. 2 is a fragmentary top plan view of the dog collar of FIG. 1.

Upper portion 30 of the bolt is supported on a reduced diameter neck portion 32 which is mounted on a circular plate 33 having a diameter greater than that of openings 18. A central opening is formed in plate 33 and communicates with the lower end of a threaded axial bore formed in neck portion 32. That bore receives a threaded bolt member 34 projecting upwards from a knurled, securing member 36. The diameter of the bolt member 34 is less than the diameter of openings 18 since it is to pass through a selected one of these openings and then into the bore formed in bolt 22, thereby to secure bolt 22 to a predetermined position on end 20 as shown best in FIGS. 3 and 4.

To assemble the dog collar of the invention in its circular configuration shown in FIG. 1 and having a desired diameter, plate 33 of bolt 22 is placed on the upper surface of end 20 such that its central opening is in registration with one of openings 18. Securing member 36 is then placed on the underside of end 20 and threaded bolt member 34 is passed through that one of openings 18 and into the threaded bore of bolt 22. The upper spherical portion 30 is then turned by hand to secure it to member 34, thereby securing bolt 22 to strip 12 at a predetermined position along end 20. Opening 14 is then directly passed over spherical portion 30 until it overlies end 20 of the strip to form the completed dog collar having a desired diameter. The two ends 16 and 20 of the strip 12 are reliably maintained in the desired overlying collar-forming position, by means of the leash-carrying hook 26 snapped through opening 24 in portion 30 which serves to secure the leash to the collar.

If it is desired to vary the diameter of the dog collar at a later time, for example, to adjust for the growth of the dog, the leash hook 26 is removed from the bolt 22, end 16 is passed over the upper portion of the bolt, and the bolt is removed from end 20 of the strip by unscrewing member 36 from upper portion 30. Threaded member 34 is then positioned through a different one of the openings 18 corresponding to the desired new diameter of the dog collar, and the assembly procedure described above is repeated, thereby to form the increased diameter dog collar as desired.

The dog collar of the present invention is thus remarkably economical and practical since it can be manufactured and sold as a standard-sized item capable of having its diameter adjusted corresponding to the size of the animal on which the collar and leash assembly is to be used. Moreover, the dog collar has a minimum number of components and thus can be easily used and adjusted even by small children having minimum manual skills, who are often the owners of dogs.

While in the above description the collar of this invention has been specifically described for use on dogs, it can be readily used on other household animals such as cats merely by adjusting the diameter of the collar. Furthermore, the plurality of spaced openings 18 on the strip may be replaced by a single longitudinal opening along which the bolt may be adjustably secured by the engagement of the member 34 into the bore of the neck portion of the fastening element.

It will thus be appreciated that while only a single embodiment of the invention has been herein specifically described, variations may be made therein without departing from the spirit and scope of the invention.

I claim:

1. An animal collar comprising an elongated flexible member having first and second openings respectively formed near each of its ends, fastening means secured at one end of said member at a preselected location with respect to one end thereof and passing through said first opening, said fastening means including a part projecting beyond the surface of said member and having an aperture provided therein, said second opening being adapted to pass over said part to cause the ends of said member to be in an overlying relationship, thereby to form from said member a loop from which said apertured part radially extends, said aperture defining means for receiving a leash therethrough, and said loop having a diameter corresponding to the relative position of said fastening means, said fastening means comprising an upper portion having said aperture formed therein, a lower reduced width portion having a threaded bore formed therein, a securing member having a base located at the opposite surface of said flexible member, and a threaded member projecting from said base through said first opening and into said threaded bore, thereby to secure said apertured part to said flexible member.

2. The collar of claim 1, in which said second openings passes over and surrounds said reduced width portion when said member ends overlie one another and said upper portion extends beyond said overlying ends, thereby to define said projecting part.

3. The collar of claim 1, in which there are a plurality of said first openings, said fastening means being positioned through a preselected one of said first openings, thereby to form said predetermined diameter loop.

* * * * *